United States Patent [19]

Aske et al.

[11] 3,910,221

[45] Oct. 7, 1975

[54] ANTI-THEFT DEVICE

[76] Inventors: Robert L. Aske, 1640 Kilmer Ave., St. Louis Park, Minn. 55426; Leonard E. Aske, 5508 Park Ave. So., Minneapolis, Minn. 55417

[22] Filed: Apr. 15, 1974

[21] Appl. No.: 461,007

[52] U.S. Cl. .............................. 116/33; 116/34 R
[51] Int. Cl.² ........................................ B60R 25/00
[58] Field of Search .................. 116/67 R, 34 R, 33

[56] References Cited
UNITED STATES PATENTS

| 1,329,210 | 1/1920 | Rickon | 116/33 |
| 1,335,827 | 4/1920 | Finn | 116/33 |
| 1,401,839 | 12/1921 | Ward | 116/33 |

*Primary Examiner*—Jerry W. Myracle
*Attorney, Agent, or Firm*—Merchant, Gould, Smith & Edell

[57] ABSTRACT

A device, for discouraging the theft of vehicles having pneumatic tires, which can be secured on the valve stem of the tire instead of the usual dust cap and which has a normal condition in which the vehicle can be freely used. When desired the device can be set to a ready condition in which it cannot be removed from the valve stem, and the vehicle left unattended. Upon his return to the vehicle the owner can readily reset the device to normal. Any unauthorized use of the vehicle, however, actuates the device to an alarm condition in which air is allowed to pass from the tire, sounding an acoustical alarm and disabling the vehicle. Upon recovery of a misappropriated vehicle, the device may easily be once more restored to its normal condition.

11 Claims, 7 Drawing Figures

U.S. Patent   Oct. 7,1975   3,910,221
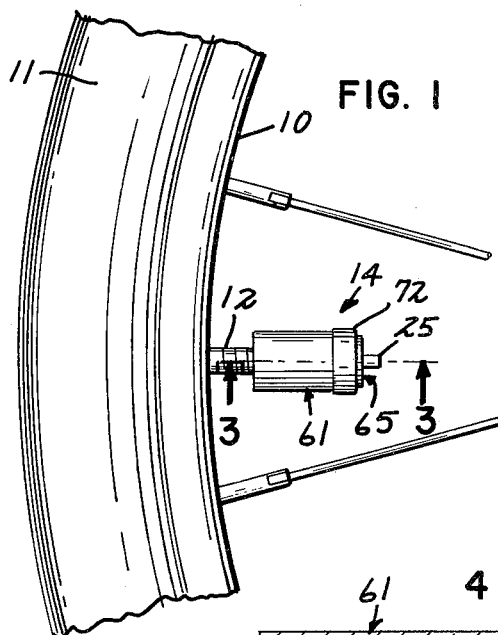
FIG. 1
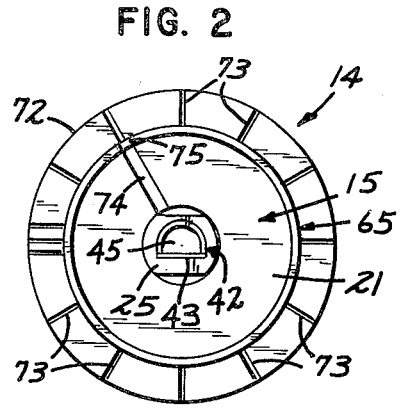
FIG. 2
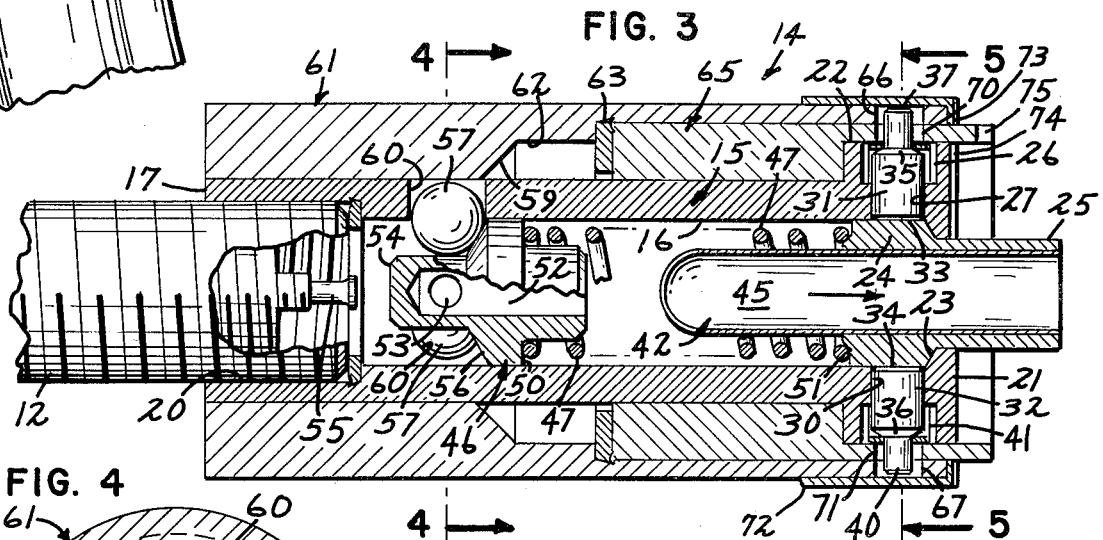
FIG. 3
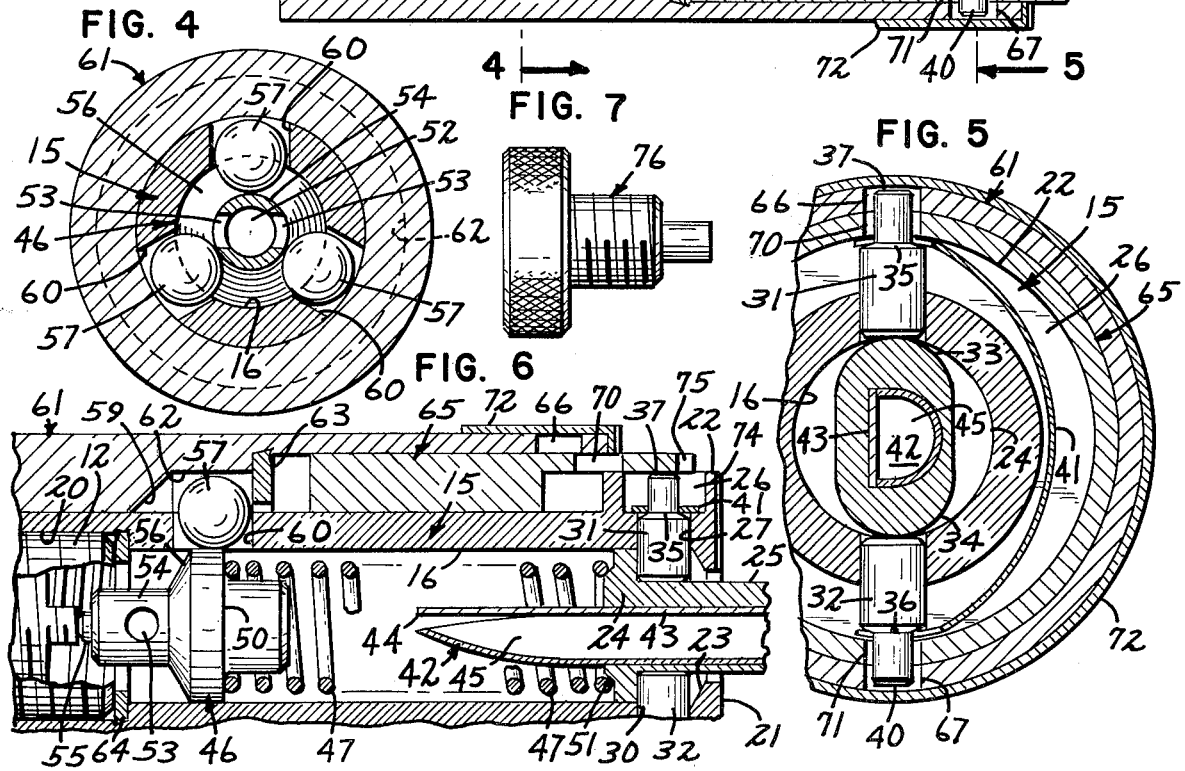
FIG. 4    FIG. 7    FIG. 5
FIG. 6

ANTI-THEFT DEVICE

BACKGROUND OF THE INVENTION

This invention relates to the field of anti-theft devices, and more particularly to devices for discouraging the theft of bicycles, and similar vehicles, having pneumatic tires with standard valve stems. Such devices are not unknown, but have previously been cumbersome, inconvenient to install and remove, and so weighty as to seriously affect the balance of the wheel and even to fatigue the valve stem, especially when the vehicle to be protected is a bicycle.

My device is light and small, mounts directly on the valve stem instead of being clamped to the wheel, is easily removed when desired yet unremovable by unauthorized persons, and requires no key to lock or unlock it. It is easily set to a ready condition, gives automatically to an alarm condition upon tampering, and is simply restored to its normal position from the ready or alarm position.

Various other objects, advantages, and features of novelty which characterize my invention are pointed out with particularity in the claims annexed hereto and forming a part hereof. However, for a better understanding of the invention, its advantages, and objects attained by its use, reference should be had to the drawing which forms a further part hereof, and to the accompanying descriptive matter, in which there is illustrated and described a preferred embodiment of the invention.

BRIEF DESCRIPTION OF THE DRAWINGS

In the drawing,

FIG. 1 shows my device attached to the stem of a bicycle tire valve;

FIG. 2 is an end view of the device;

FIG. 3 is a section on line 3—3 of FIG. 1, showing the device in its normal condition;

FIGS. 4 and 5 are sections along lines 4—4 and 5—5 of FIG. 3, FIG. 5 being on a somewhat larger scale;

FIG. 6 is a sectional showing the device in its alarm condition; and

FIG. 7 shows a tool useful in resetting the device.

DESCRIPTION OF THE PREFERRED EMBODIMENT

FIG. 1 is a fragmentary showing of the wheel 10 of a vehicle such as a bicycle having a tire 11, the stem 12 of which passes inwardly through the wheel rim. This figure shows that my device 14 is simply threaded on the end of stem 12 in place of the usual dust cap. The structure is more clearly shown in FIG. 3 to comprise a housing 15 having a principal bore 16. At its outer end 17 the housing bore is tapped to threadedly engage the valve stem 12 as at 20. At its inner end 21 housing 15 has an enlarged head 22, and bore 16 is shouldered in at 23 to rotatably receive a plug 24 which projects from the end 21 of housing 15 to comprise a knob 25.

Head 22 of housing 15 is annularly grooved at 26, and diametrically disposed cross bores 27, 30 are drilled in the groove to slidingly receive a pair of plungers 31, 32, which accordingly ride on plug 24. The plug is of non-circular section in the axial area of its contact with plungers 31, 32, to provide a double-lobed camming surface 33, 34. The plungers are shouldered down at 35, 36 to form locking pins 37, 40 of reduced diameter, and an arcuate compression spring 41 acts on shoulders 35, 36 to urge the plungers against camming surfaces 33, 34.

Plug 24 is centrally bored to receive an acoustical signal generator 42 in the form of a reed 43, one end 44 of which is free to vibrate with respect to a hollow chamber 45 under the influence of air passing through the generator in the direction of the arrow in FIG. 3.

A piston 46 is slidably received in bore 16 and is urged toward end 17 of the housing by a helical compression spring 47 which at one end engages a shoulder 50 on piston 46 and at the other end engages a shoulder 51 surrounding generator 42 and plug 24. Piston 46 is centrally bored at 52 for most of its length, and then cross bored at 53 to provide a passage for air through the piston. Externally, the piston tapers to a pin 54 of a smaller diameter suitable to enter the valve stem and engage the core 55 of the valve. The taper of the piston acts as a camming surface 56, and a plurality of balls 57 ride on pin 54 and surface 56, and are partially contained within opening 60 in housing 15, the wall thickness of which is substantially equal at this point to the radius of the ball.

An inertia weight 61 is frictionally mounted on housing 15 for both axial and rotational movement with respect thereto. In the normal position of weight 61 it engages the outer periphery of balls 57 and hence prevents them from yielding radially to allow piston 46 to move toward end 17 of housing 15. Weight 61 is however inwardly grooved at 62, so that the weight is displaced axially toward end 17. The balls 57 can be moved into the groove 62 by camming surface 56, thus freeing piston 46 for movement in bore 16. Groove 62 is provided with a camming surface 59. A weight retainer 63 is staked or otherwise secured into weight 61 to limit this movement of the weight, since the inner halves of the balls are still contained in opening 60. Retaining means 64, such as a C-ring prevents piston 46 from ever moving out of bore 16.

At its inner end the bore of weight 61 is enlarged, and a cylindrical lock weight 65 concentric with weight 61 and housing 15 is installed therebetween, fitting between retainer 63 and the head 22 of housing 15. Lock weight 65 has the same frictionally limited freedom to move, between housing 15 and inertia weight 61, that the latter has for movement on housing 15.

Near their inner ends weight 61 and 65 are cross bored at diametrically opposite locations, as at 66, 67, and 70, 71, respectively. The apertures are sized and positioned to receive pins 37, 40 of plungers 31, 32 when the weights are suitably aligned axially and rotationally. Outwardly, the apertures are masked by a dial cap 72 pressed on weight 61 and bearing indicia 73 on its end portion similar to the dial of a clock. These indicia are best seen in FIG. 2, which also shows indicia 74 and 75 carried by housing 15 and lock weight 65 respectively. The several indicia are applied during manufacture, and are so located that when they are angularly aligned, as shown in FIG. 2, the apertures 66, 70 and 67, 71 are aligned with pins 37, 40, and knob 25 may be rotated to actuate lobes 33, 34 to displace plungers 31, 32, so that the pins enter the apertures, locking weights 61 and 65 against axial or rotative movement with respect to each other and the housing 15.

If desired, one or more additional cylinders may be provided to give a triple or even more complex "combination."

Operation

My device is installed on a valve stem by removing the usual dust cap and substituting the device, locking pins 37 and 40 at that time securing weights 61 and 65 to housing 15. The vehicle may now be used freely: if additional air is needed in the tire the device is simply unscrewed to permit this and afterward replaced.

When the owner desires to leave the vehicle unattended, he parks it, rotates knob 25 to retract the pins, and manually rotates the weights out of the condition of alignment, remembering of course the "combination" which is not necessarily that shown in FIG. 2. Upon his return, he resets the combination and actuates knob 25 to restore the pins to the locking position.

If unauthorized use of the vehicle is undertaken, the centrifugal force resulting from wheel rotation drives weights 61 and 65 away from the center of the wheel, toward end 17 of housing 15. This moves groove 62 into axial alignment with balls 57, which are displaced into the groove by the camming surface 56 of piston 46 under the action of spring 47. When the balls are fully retracted, spring 47 is enabled to drive piston 46 into engagement with the core of valve 55, and is enough stronger than the valve spring to depress the core, allowing air to escape from the tire. The air passes through cross bore 53 and bore 52 in the piston and out through signal generator 42, giving an audible indication that the vehicle is being operated without authorization, and quickly deflating the tire to make the vehicle unusable at any great speed.

A tamperer even aware of the presence of the device is nevertheless unable to remove it from the tire, unless he resets to the him unknown combination, because weight 61 is rotatable on housing 15 and does not transmit sufficient torque to the latter to loosen it from the valve stem.

Upon recovery of a misappropriated vehicle, the device must be reset to its normal condition by the following procedure. The wheel is turned so that the stem projects downward from the top of the rim. This allows lock weight 65 to slide toward end 21 of the housing. Inertia weight 61 is retained displaced in the other direction, however, by the action of balls 57 in grooves 62, and apertures 70 and 71 become visible around the end of lock weight 65. The latter is rotated on housing 15 until the apertures are visibly aligned with pins 37 and 40. Knob 25 is then turned until the pins engage apertures 70 and 71. Now by grasping the device at its end 21, sufficient grip is obtained on the lock weight to remove the device from the valve stem. Next, axial pressure is applied to pin 54: a useful tool 76 for this purpose is shown in FIG. 7. This acts to compress spring 47, moving piston 46 until balls 57 can be forced back through apertures 60 by pushing weight 61 toward end 21 of the device to engage the balls with camming surface 59. When the weights are back in their usual positions, inertia weight 61 is again free to be restored to its normal position axially, and by resetting the combination, to its normal position rotationally. Knob 25 can now be fully rotated to lock weight 61 in position. The resetting tool is removed from the housing, and the device is now restored to its normal condition.

Numerous objects and advantages of my invention have been set forth in the foregoing description, together with details of the structure and function of the invention, and the novel features thereof are pointed out in the appended claims. The disclosure, however, is illustrative only, and changes may be made in detail especially in matters of shape, size, and arrangement of parts, within the principle of the invention, to the full extent indicated by the broad general meaning of the terms in which the appended claims are expressed.

What is claimed is:

1. An anti-theft device for application to the valve stem of a vehicle tire comprising, in combination:

a hollow housing closed at a first end by an air actuated sound producer and adapted at the second end to be applied to the valve stem;

a piston movable longitudinally in said housing, having a pin extending in the direction of said second end thereof and a radially extending camming surface;

means resiliently urging said piston toward said second end of said housing to an alarm position where said pin may depress the valve core;

means normally preventing movement of said piston toward said alarm position;

and further means including a weight centrifugally slidable on said housing for disabling the last-named means, whereby to initiate actuation of said sound producer and deflation of said tire.

2. Apparatus according to claim 1 in which said weight is freely rotatable on said housing to prevent unauthorized removal of said device from said stem.

3. Apparatus according to claim 2 together with means operable to fix said weight to said housing, whereby to permit said device to be installed on and removed from said stem.

4. Apparatus according to claim 3 in which the locking means includes at least one plunger actuable into engagement with an aperture in said weight, together with cam means for actuating said plunger.

5. Apparatus according to claim 4 in which a pair of said plungers are actuable radially in openings in said housing, together with arcuate compression spring means resiliently urging said plungers against said cam means.

6. Apparatus according to claim 4 together with indicia carried by said housing and said weight for indicating when they are in proper alignment to enable operation of said actuating means.

7. Apparatus according to claim 1 together with means fixing said weight to said housing to prevent said weight from performing said disablement.

8. Apparatus according to claim 1 in which the second named means comprises at least one ball partially contained in an aperture in said housing and partially engaging said camming surface of said piston, and in which the further means includes a surface engaging said ball to prevent its movement through said aperture and a chamber axially displaced from said surface for receiving said ball after it passes through said aperture.

9. Apparatus according to claim 8 together with means for normally positioning said weight so that the first surface engages said ball.

10. Apparatus according to claim 1 together with means retaining said piston within said housing.

11. Apparatus according to claim 2 in which said weight is made up of at least two concentric portions capable of rotational and limited axial relative motion.

* * * * *